United States Patent
Hu

(10) Patent No.: US 10,109,828 B2
(45) Date of Patent: Oct. 23, 2018

(54) HOUSING AND ELECTRONIC DEVICE WITH MOUNTING STRUCTURE FOR MOUNTING BATTERY

(71) Applicant: AMBIT MICROSYSTEMS (SHANGHAI) LTD., Shanghai (CN)

(72) Inventor: Wang-An Hu, Shanghai (CN)

(73) Assignee: AMBIT MICROSYSTEMS (SHANGHAI) LTD., Shanghai (CN)

(*) Notice: Subject to any disclaimer, the term of this patent is extended or adjusted under 35 U.S.C. 154(b) by 636 days.

(21) Appl. No.: 14/645,670

(22) Filed: Mar. 12, 2015

(65) Prior Publication Data

US 2015/0340668 A1    Nov. 26, 2015

(30) Foreign Application Priority Data

May 23, 2014 (CN) .......................... 2014 1 0220869

(51) Int. Cl.
*H01M 2/10* (2006.01)
*H01M 10/42* (2006.01)

(52) U.S. Cl.
CPC ....... *H01M 2/1016* (2013.01); *H01M 2/1022* (2013.01); *H01M 2/1072* (2013.01); *H01M 10/425* (2013.01)

(58) Field of Classification Search
None
See application file for complete search history.

(56) References Cited

U.S. PATENT DOCUMENTS

| 4,031,295 A | 6/1977 | Rigazio |
| 8,254,114 B2 | 8/2012 | Lin |
| 2011/0033740 A1* | 2/2011 | Zhang ................... G06F 1/1635 429/100 |
| 2011/0183174 A1 | 7/2011 | Ouyang |

FOREIGN PATENT DOCUMENTS

| CN | 200944415 Y | 9/2007 |
| CN | 101990013 A | 3/2011 |
| CN | 101990014 A | 3/2011 |
| CN | 201947577 U | 8/2011 |
| CN | 102412857 A | 4/2012 |
| TW | M320825 U | 10/2007 |
| TW | I429363 B | 3/2014 |

* cited by examiner

*Primary Examiner* — Maria Laios
(74) *Attorney, Agent, or Firm* — ScienBiziP, P.C.

(57) ABSTRACT

A housing includes a main body, a mounting structure assembled to the main body, and a cover. The mounting structure includes a receiving part defining a receiving space for receiving a battery, a groove communicating with the receiving space, a slot communicating with the groove, and a driving member rotatably mounted in the receiving part. The driving member includes an extending arm and a pressing portion. The extending arm faces the groove. The pressing portion passes through the slot to expose out of the receiving part. The cover is detachably attached to the main body to seal the receiving space. When the battery is received in the receiving portion, the extending arm supports the battery, when the pressing portion is pressed, the extending arm is driven to rotate with respect to the receiving part so as to make the battery lift from the receiving space.

16 Claims, 7 Drawing Sheets

HOUSING AND ELECTRONIC DEVICE WITH MOUNTING STRUCTURE FOR MOUNTING BATTERY

FIELD

The subject matter herein generally relates electronic devices, and more particularly to a housing and an electronic device with mounting structure for mounting a battery.

BACKGROUND

Most electronic devices, such as phones, remote controllers and so on, are assembled with a battery. The electronic device comprises a groove, a battery is secured in the groove, and a lid covers the groove to seal the battery.

BRIEF DESCRIPTION OF THE DRAWINGS

Implementations of the present technology will now be described, by way of example only, with reference to the attached figures, wherein.

DETAILED DESCRIPTION

Figure 1:
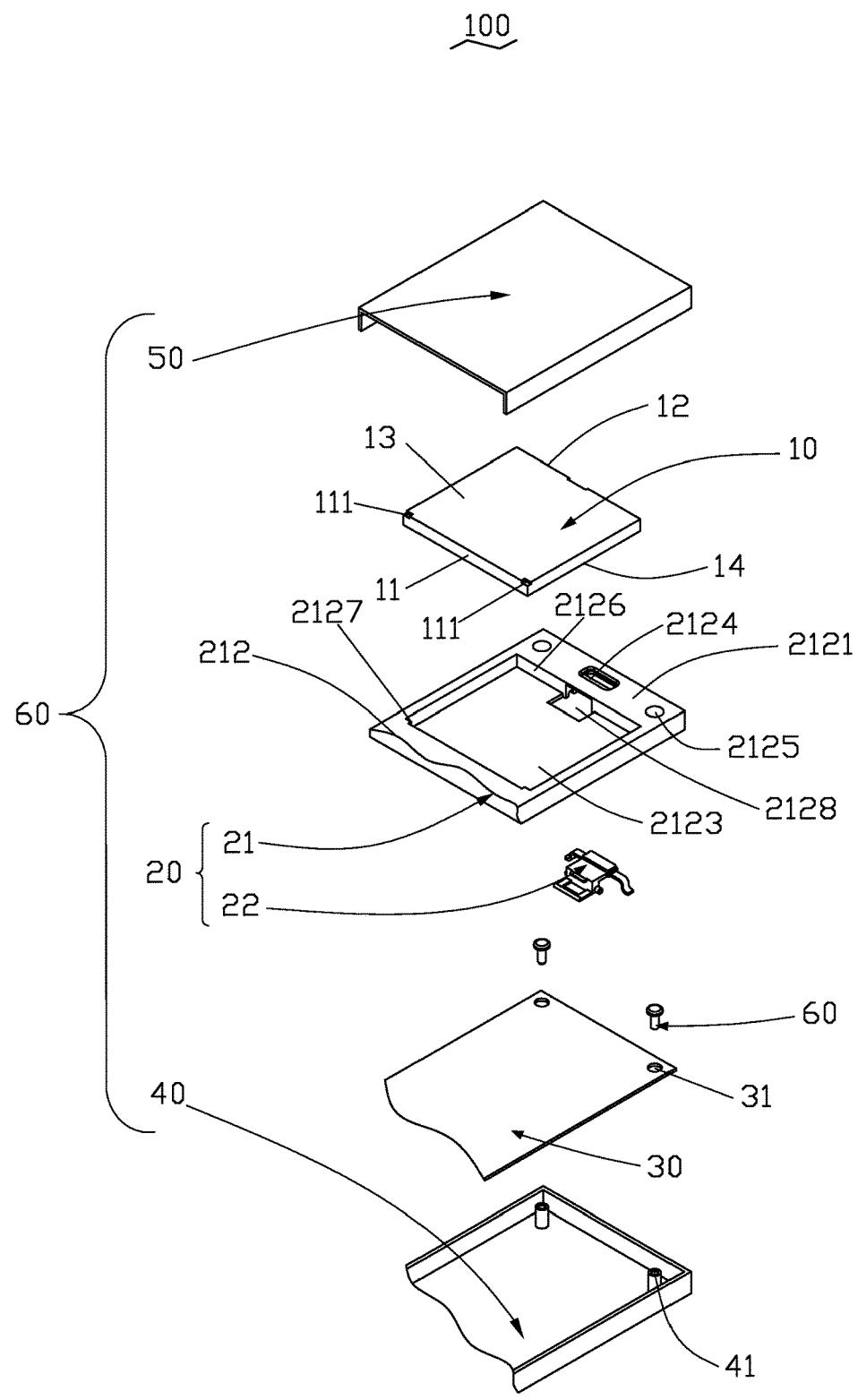
FIG. 1 is an exploded view of a structure for mounting a battery to an electronic device, the electronic device includes a battery, a circuit board and a housing, the housing includes a mounting structure including a receiving part and a driving member.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a housing and an electronic device with structure for mounting a battery.

FIG. 1 illustrates that an electronic device 100 includes a battery 10, a circuit board 30, and a housing 60. The housing 60 includes a mounting structure 20 for holding the battery 10, a main body 40 assembled to the mounting structure 20, and a cover 50 covering the battery 10.

Figure 7:
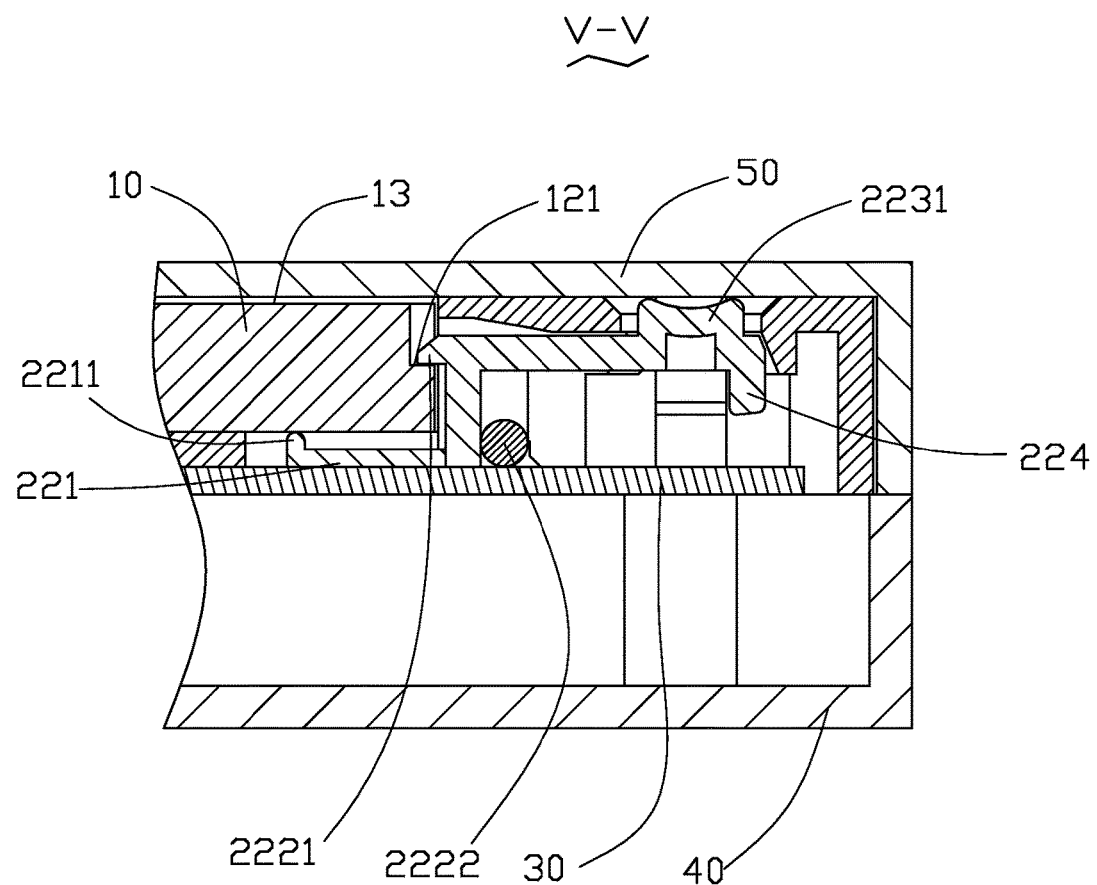
FIG. 7 is a partial cross-sectional view taken along V-V of the electronic device of FIG. 6.

The battery 10 is electronically coupled to the circuit board 30. The battery 10 includes a first ending 11, a second ending 12 opposite to the first ending 11, a first surface 13 perpendicular to the first ending 11, and a second surface 14 opposite to the first surface 13. The first ending 11 defines a pair of notches 111 adjacent to two corners of the first surface 13. The second ending 12 includes latching portion 121 (see FIG. 7). The first surface 13 is facing the cover 50 and the second surface 14 is facing to the mounting structure 20.

Figure 2:
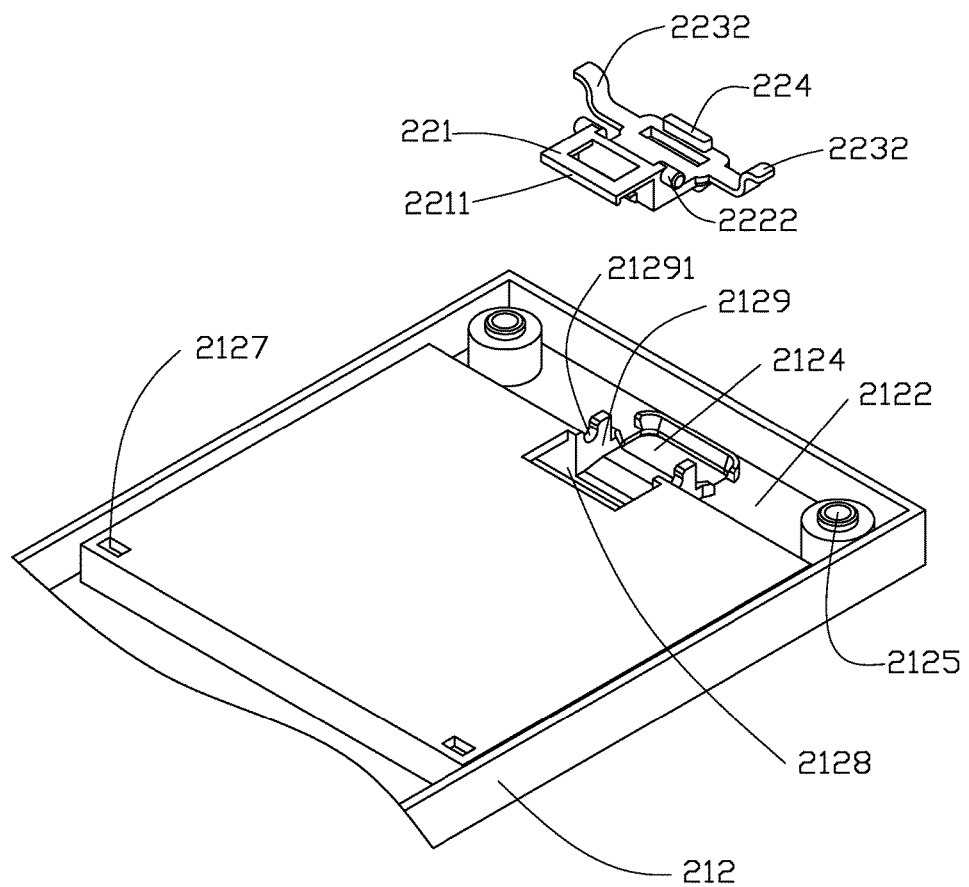
FIG. 2 is an isometric view of the mounting structure of FIG. 1.

FIG. 2 illustrates that the mounting structure 20 includes a receiving part 21 and a driving member 22 rotatably mounted in the receiving part 21.

The receiving part 21 includes a receiving portion 212. The receiving portion 212 includes a top surface 2121, a bottom surface 2122 opposite to the top surface 2121; a receiving space 2123 is defined on the top surface 2121 for receiving the battery 10; a slot 2124 and a plurality of screw holes 2125 communicate with the receiving space 2123. The receiving portion 212 further includes a plurality of sidewalls 2126 surrounding the receiving portion 212. One of the plurality of the sidewalls 2126 defines a pair of latching parts 2127 corresponding to the notch 111 of the battery 10. A groove 2128 is defined in another sidewall 2126 opposite to the latching parts 2127 and communicates with the receiving space 2123, so as to communicate with the slot 2124. A plurality of screws 60 are passed through the plurality of screw holes 2125 to secure the receiving part 21 to the main body 40. A bracket 2129 is located on the bottom surface 2122 and sandwiched between the slot and the groove 2128. The bracket 2129 includes a pair of axle holes 2129.

Figure 3:
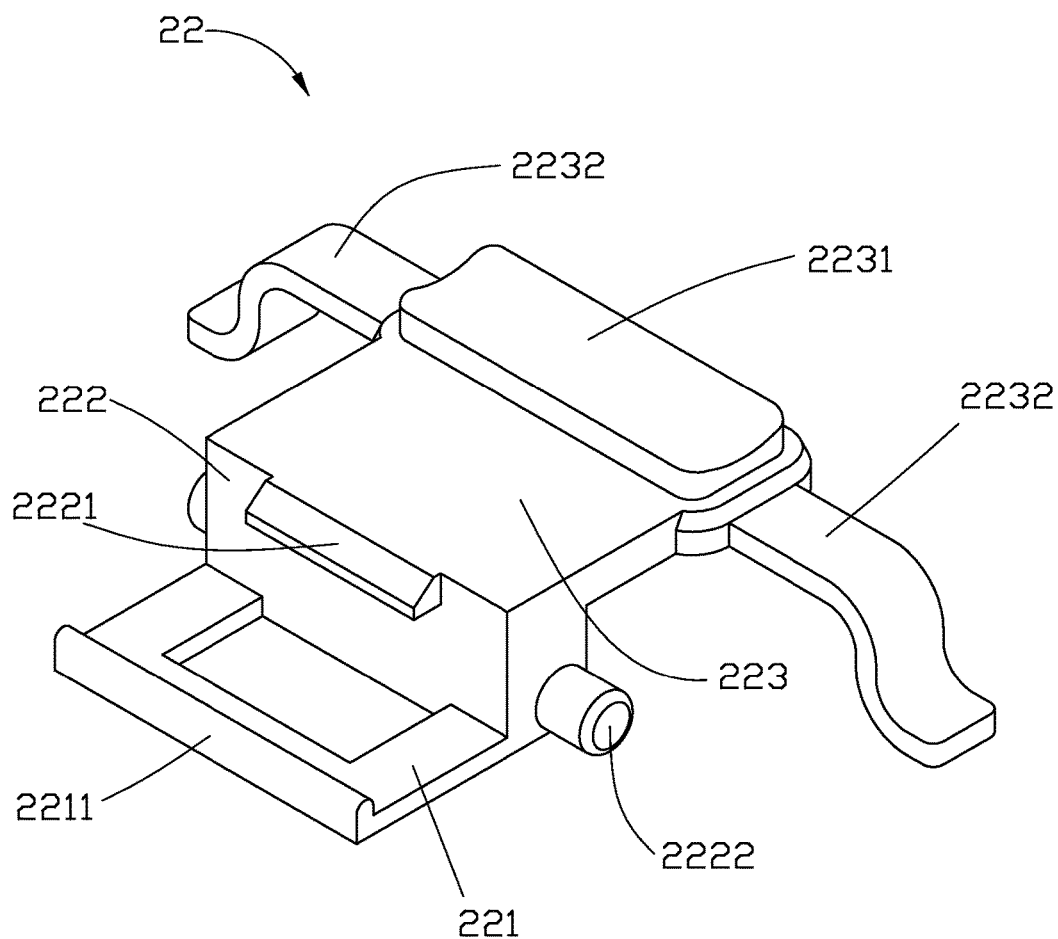
FIG. 3 is an isometric view of the driving member of FIG. 1.
Figure 4:
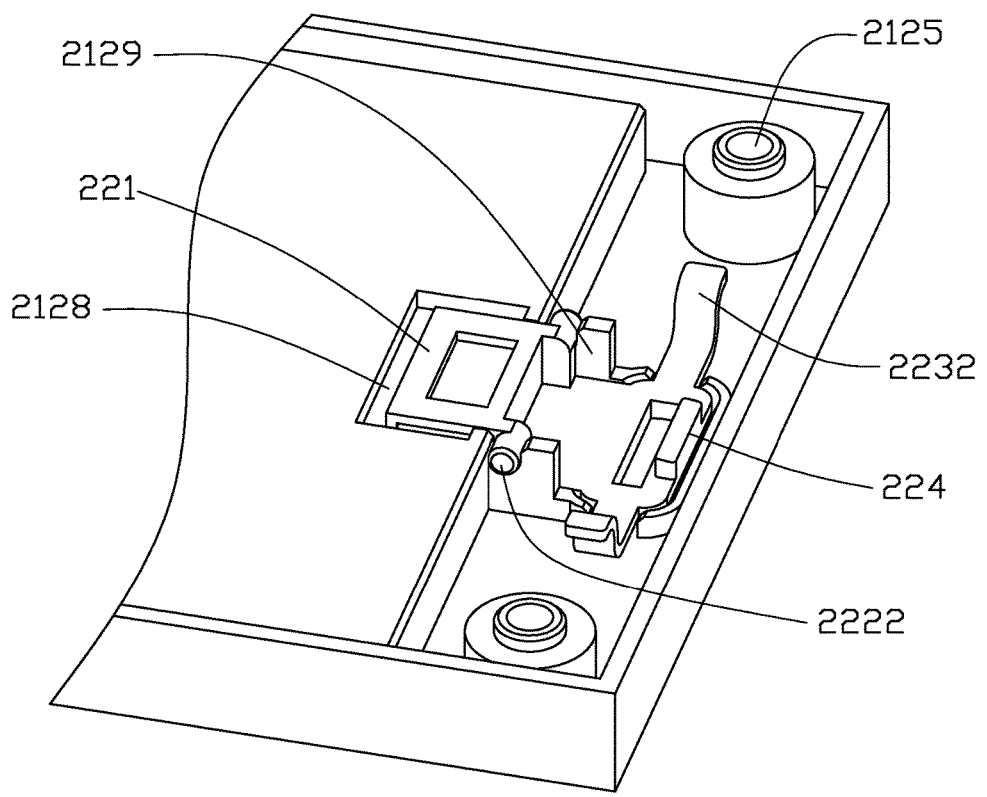
FIG. 4 is an isometric view of the driving member assembled on the receiving part of FIG. 1.
Figure 5:
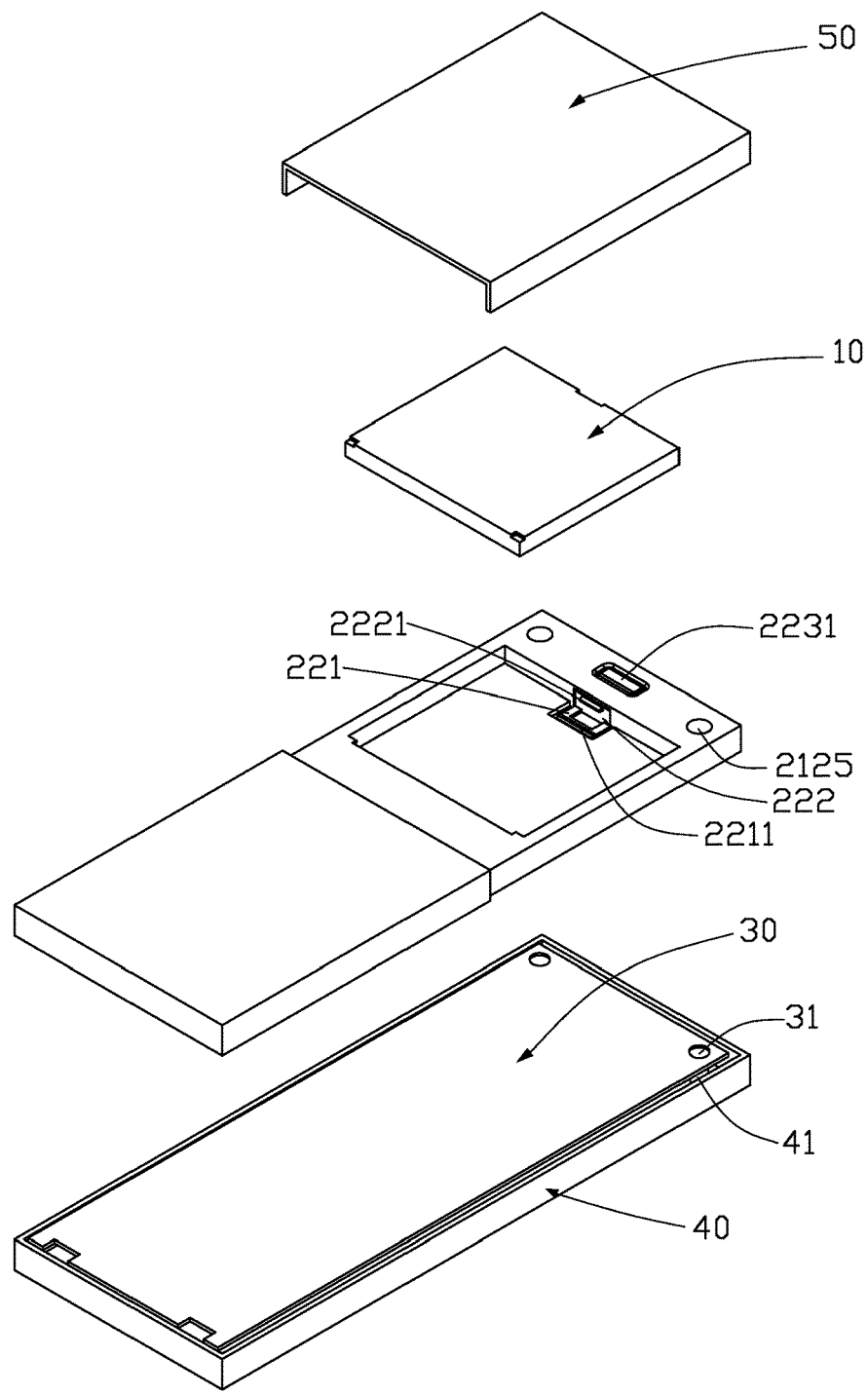
FIG. 5 is an exploded isometric view of the battery and the circuit board assembled on the housing of FIG. 1.
Figure 6:
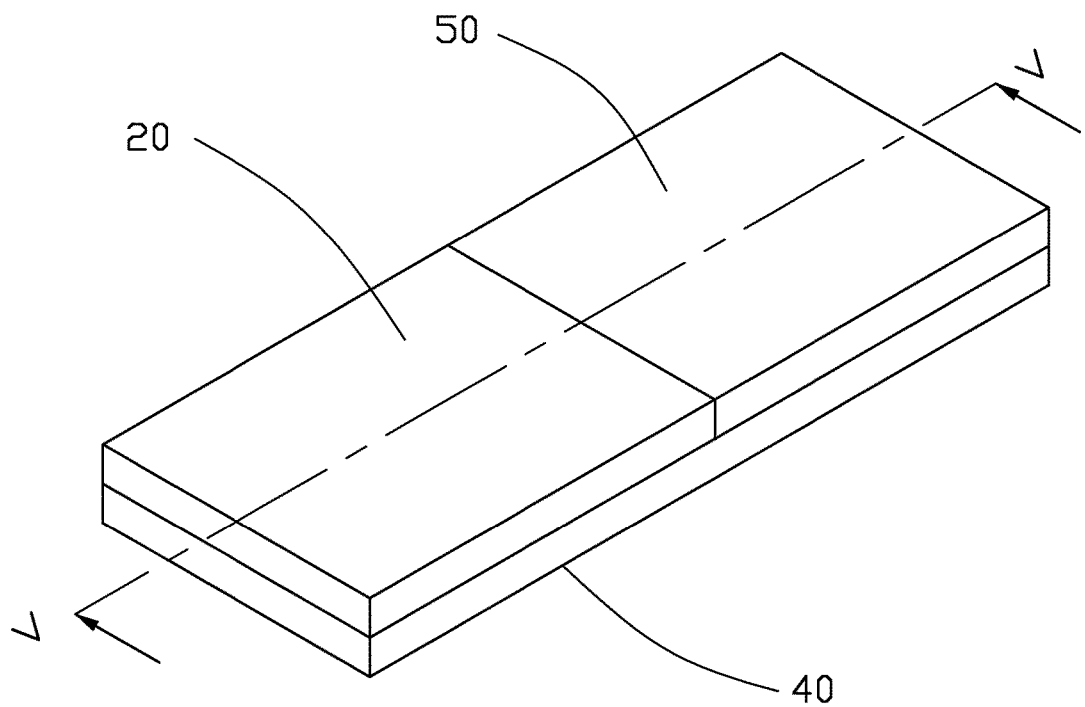
FIG. 6 is an isometric view of the electronic device of FIG. 5.

FIG. 3 illustrates that the driving member 22 is rotatably mounted in the receiving part 21, which includes a extending arm 221, a first connecting portion 222 extending upwardly perpendicular to the extending arm 221, a second connecting portion 223 extending perpendicular to the first connecting portion 222, and a stopping portion 224 perpendicularly protruding downward from one end of the second connecting portion 223 away from the first connecting portion 222.

The extending arm 221 is located in the receiving space 2123 and facing the groove 2128. The extending arm 221 includes a hook 2211. The hook 2211 protrudes upwardly from one end of the extending arm 221 away from the first connecting portion 222. When the battery 10 is received in the receiving space 2123, the hook 2211 supports the battery 10. When the extending arm 221 is rotated with respect to the receiving part 21, the hook 2211 drives the battery 10 to lift from the receiving portion. In the illustrated embodiment, the extending arm 221 is resilient. When the extending arm 221 is rotated to lift the battery 10 from the receiving space 2123, the extending arm 221 can be reformed to an original state.

A projecting tab 2221 and a pair of shafts 2222 protrudes from the first connection 222. The shafts 2222 are located on two sides of the first connecting portion 222. The projecting tab 2221 extends from a side of the first connecting portion 222 which is connected to the extending arm 221. When the battery 10 is received in the receiving part 21, the projecting tab 2221 passes through the groove 2128 and engages with latching portion 121 to secure the battery 10 in the receiving space 2123. The pair of shafts 2222 is passed through the axle hole 21291 of the bracket 2129 to couple the driving member 22 to the receiving part 21.

The second connecting portion 223 is parallel to the extending arm 221. The second connecting portion 223 includes a pressing portion 2231 and a pair of supporting arms 2232 extending from two sides of the pressing portion 2231 to support the driving member 22 on the circuit board 30. The pressing portion 2231 is passed through the slot 2124 exposing out of the receiving part 21. When the pressing portion 2231 is pressed by an external force, the extending arm 221 is rotated with respect to the receiving part 21 so as to make the battery 10 lift from the receiving space 2123. In the illustrated embodiment, the height of the pair of supporting arms 2232 in a perpendicular direction is equal to the length of the first connecting portion 222 to position the driving member 22 steadily on the circuit board 30. In the illustrated embodiment, the supporting arm 2232 is resilient.

Length of the stopping portion 224 is less than the length of the first connecting portion 222. When the driving member 22 is pressed to be resisted with the battery 10, the extending portion 221 is rotated around the shafts 2222 until the stopping portion 224 is touched to the circuit board 30 to stop the driving member 22 from rotating and raising the battery 10 from the receiving space 2123.

The circuit board 30 defines a plurality of installation holes 31 corresponding to the screw holes 2125. Correspondingly, the main body 40 includes a plurality of pillars 41 with respect to the screw holes 2125 and the installation holes 31. The pillars 41 are hollow cylinders and define a plurality of threads (not shown) on an inner wall, and the screws 60 are threaded in the plurality of threads (not shown).

In the illustrated embodiment, the latching part 2127 of the receiving part 21 and the projecting tab 2221 of the driving member 22 respectively engages with the battery 10 in order to make the battery 10 to be secured in the receiving space 2123 and solve the problem of the battery 10 being able to fall from the receiving space 2123 easily.

FIGS. 4-7 illustrate that in assembly of the battery 10 to the receiving part 21, first, the driving member 22 is installed on the receiving part 21. In detail, the shafts 2222 are passed through the axle holes 21291 and the extending arm 221 is passed through the groove 2128, and the pressing portion 2231 is passed through the slot 2124. Second, the circuit board 30 is received in the main body 40. The screws 60 are respectively passed through the screw holes 2125, the installation holes 31, and the pillars 41 to make the mounting structure 20 and the circuit board 30 mounted in the main body 40. Third, the battery 10 is secured in the receiving space 2123. In detail, the notches 111 of the battery 10 engage with the latching part 2127 and the second ending 12 is facing the receiving space 2123. The latching portion 121 is latched with the projecting tab 2221 and the battery 10 is electrically coupled to the circuit board 30. Fourth, the cover 50 is covering the battery 10.

In disassembly of the battery 10 from the receiving part 21, first, the cover 50 is opened. Second, the pressing portion 2123 is pressed to make the extending arm 221 rotate around the shafts 2222, the extending arm 221 and the supporting arm 2232 are deformed, and the hook 2211 of the extending arm 221 lift the battery 10 from the receiving space 2123 until the stopping portion 224 contacts with the circuit board 30 to make the extending portion 221 stop Simultaneously, the latching portion 121 is detached from the projecting tab 2221 of the driving member 22 and the notches 111 are detached from the latching part 2127 of the receiving part 21. When the battery 10 is lifted from the mounting structure 20, the extending arm 221 and the supporting arm 2232 are returned to the original state.

The embodiments shown and described above are only examples. Many details are often found in the art such as the other features of an electronic device with structure for mounting a battery. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A housing for mounting a battery, the housing comprising:
   a main body;
   a mounting structure assembled to the main body, the mounting structure comprising:
      a receiving part defining a receiving space for receiving the battery, a groove communicating with the receiving space, and a slot communicating with the groove; and
      a driving member rotatably mounted in the receiving part, the driving member having an extending arm facing the groove and a pressing portion extending through the slot and out of the receiving part, wherein a first connecting portion extends perpendicular to the extending arm and a second connecting portion extends perpendicular to the first connecting portion, a pair of supporting arm extends from two ends of the second connecting portion, the pair of supporting arm supports for the driving member and make the pressing portion to be received in the slot, wherein when the battery is received in the receiving space, the extending arm supports the battery, and when the pressing portion is activated, the extending arm rotates with respect to the receiving part lifting the battery from the receiving space; and
   a cover detachable with respect to the main body.

2. The housing of claim 1, wherein a hook protrudes from one end of the extending arm away from the pressing portion, when the driving member is rotated, the hook is resisted with the battery to lift the battery from the receiving portion.

3. The housing of claim 1, wherein the second connecting portion is parallel to the extending arm, and the pressing portion protrudes from one side of the second connecting portion away from the first connecting portion.

4. The housing of claim 3, wherein the length of the first connecting portion is equal to the height of the pair of supporting arm in direction of perpendicularity to make the driving member to be steady.

5. The housing of claim 4, wherein the first connecting portion comprises a projecting tab, the projecting tab protrudes from the first connecting portion and passes through the groove to be latched with the battery to mount the battery in the receiving portion.

6. The housing of claim 5, wherein the first connecting portion comprises a pair of shafts, the pair of shafts is located on two sides of the first connecting portion, a bracket is located on the receiving space, the bracket comprises a pair of axle holes, and the pair of shafts engages with the bracket and is rotated in the pair of axle holes.

7. The housing of claim 6, wherein the driving member further comprises a stopping portion, the stopping portion perpendicularly protrudes from the second connecting portion, a length of the stopping portion is less than the length of the first connecting portion, and the driving member is rotated to make the battery lift from the receiving space until the stopping portion stops the driving member to be rotated.

8. The housing of claim 3, wherein the driving member is integrated molding and in resilient, when the pressing portion is pressed, the supporting arm is deformed to make the extending arm to be rotated with respect to the receiving part.

9. An electronic device, comprising:
a battery;
a circuit board electronically coupled to the battery; and
a housing for holding the battery and secured on the circuit board, the housing comprising a main body, and a mounting structure assembled to the main body, the mounting structure comprising:
a receiving part defining a receiving space for receiving the battery, a groove communicating with the receiving space, and a slot communicating with the groove; and
a driving member rotatably mounted in the receiving part, the driving member having an extending arm facing the groove and a pressing portion extending through the slot and out of the receiving part, wherein a first connecting portion extends perpendicular to the extending arm and a second connecting portion extends perpendicular to the first connecting portion, a pair of supporting arm extends from two ends of the second connecting portion, the pair of supporting arm supports for the driving member and make the pressing portion to be received in the slot, wherein when the battery is received in the receiving space, the extending arm supports the battery, and when the pressing portion is activated, the extending arm rotates with respect to the receiving part lifting the battery from the receiving space; and
a cover detachable with respect to the main body.

10. The electronic device of claim 9, wherein a hook protrudes from one end of the extending arm away from the pressing portion, when the driving member is rotated, the hook is resisted with the battery to lift the battery from the receiving portion.

11. The electronic device of claim 9, wherein the second connecting portion is parallel to the extending arm, and the pressing portion protrudes from one side of the second connecting portion away from the first connecting portion.

12. The electronic device of claim 11, wherein the length of the first connecting portion is equal to the height of the pair of supporting arm in direction of perpendicularity to make the driving member to be steady.

13. The electronic device of claim 12, wherein the first connecting portion comprises a projecting tab, the projecting tab protrudes from the first connecting portion and passes through the groove to be latched with the battery to mount the battery in the receiving portion.

14. The electronic device of claim 13, wherein the first connecting portion comprises a pair of shafts, the pair of shafts is located on two sides of the first connecting portion, a bracket is located on the receiving space, the bracket comprises a pair of axle holes, and the pair of shafts engages with the bracket and is rotated in the pair of axle holes.

15. The electronic device of claim 14, wherein the driving member further comprises a stopping portion, the stopping portion perpendicularly protrudes from the second connecting portion, a length of the stopping portion is less than the length of the first connecting portion, and the driving member is rotated to make the battery lift from the receiving space until the stopping portion stops the driving member to be rotated.

16. The electronic device of claim 11, wherein the driving member is integrated molding and in resilient, when the pressing portion is pressed, the supporting arm is deformed to make the extending arm to be rotated with respect to the receiving part.

* * * * *